(12) United States Patent
Hu

(10) Patent No.: US 8,008,752 B2
(45) Date of Patent: Aug. 30, 2011

(54) COMPONENT FOR AN INFORMATION DISPLAY DEVICE

(75) Inventor: Chun-Min Hu, Keelung (TW)

(73) Assignee: TPK Touch Solutions Inc., Taipei (TW)

( * ) Notice: Subject to any disclaimer, the term of this patent is extended or adjusted under 35 U.S.C. 154(b) by 42 days.

(21) Appl. No.: 12/339,538

(22) Filed: Dec. 19, 2008

(65) Prior Publication Data

US 2009/0123669 A1 May 14, 2009

Related U.S. Application Data

(63) Continuation of application No. 11/501,805, filed on Aug. 10, 2006, now Pat. No. 7,553,749.

(51) Int. Cl.
*H01L 23/58* (2006.01)

(52) U.S. Cl. ............ 257/632; 257/650; 257/E21.44

(58) Field of Classification Search ............ 438/609; 257/632, 650
See application file for complete search history.

(56) References Cited

U.S. PATENT DOCUMENTS

| | | | |
|---|---|---|---|
| 6,439,943 B1 | 8/2002 | Aoki et al. | |
| 2002/0028571 A1 | 3/2002 | Sheung | |
| 2002/0086188 A1 | 7/2002 | Halsey, IV et al. | |
| 2002/0094660 A1 * | 7/2002 | Getz et al. | 438/455 |
| 2004/0137240 A1 * | 7/2004 | Halsey et al. | 428/446 |
| 2006/0046460 A1 | 3/2006 | Shu | |
| 2006/0097260 A1 | 5/2006 | Huang | |

FOREIGN PATENT DOCUMENTS

EP 1498259 A1 7/2004

* cited by examiner

*Primary Examiner* — Chuong A Luu
*Assistant Examiner* — Nga Doan
(74) *Attorney, Agent, or Firm* — Gokalp Bayramoglu; Anna Tsang

(57) ABSTRACT

A component for an information display device has a transparent substrate having a surface that has a first refractive index. The surface is selectively coated in a pattern comprising a transparent electrically conductive layer disposed at least at a first region of the surface and at a second region of the surface. The first region of the surface is separated from the second region by a third region that is devoid of the transparent conductive layer. The transparent conductive layer has a second refractive index that is higher than the first refractive index. The first, second and third regions are commonly overcoated with a transparent layer comprising nonconductive nanoparticles, the overcoating layer being disposed over the transparent conductive layer at the first and second regions and also disposed over the third region that is devoid of the transparent conductive layer. The refractive index of the layer comprising nanoparticles is higher than the first refractive index.

38 Claims, 5 Drawing Sheets

COMPONENT FOR AN INFORMATION DISPLAY DEVICE

CROSS-REFERENCES TO RELATED APPLICATIONS

This application is a continuation of application Ser. No. 11/501,805 filed Aug. 10, 2006 entitled "Method of Hiding Transparent Electrodes on A Transparent Substrate".

FIELD OF THE INVENTION

The present invention relates to a method of hiding transparent electrodes on a transparent substrate, and more particularly to a method that coats a solution of non-conductive nanoparticles onto a transparent substrate to prevent a different refractive index of light at any position of the transparent substrate that will cause a poor image quality of the screen.

BACKGROUND OF THE INVENTION

In recent years, technologies advance and cause a fast development for various different products, particularly the electronic, information, and communication products. These products not only come with innovative designs, structures and functions, but also meet the requirements for user-friendly application and input method as well as providing diversified features. The development of a touch panel has changed the input mode of the traditional electronic products, so that users are no longer restricted by a traditional input device (such as a press key or a mouse for inputting data or operating instructions.) A user just needs to use the user-friendly input interface of a touch panel and follows the functional icon on a screen to click the desired function and instruction directly by a finger or a touch pen to execute a task without going through special training and learning. At present, touch panels are used extensively in different personal electronic products such as a palm-sized PC, a personal digital assistant (PDA), and an information appliance, and these products are used in public information stations for the medical treatment, traffic, travel and education related area, such that the scope of applicability and the market requirements of the touch panels tend to be expanded continuously.

In general, a touch panel installs an ITO film onto a transparent glass substrate to form an ITO glass that generally operates together with a flat cable and a circuit board, and a control IC installed on the circuit board executes a control instruction according to the corresponding position pressed by a user, so as to achieve the purpose of inputting data and instruction through the touch panel. Since these touch panels are commonly installed for various different electronic products as a liquid crystal display (LCD), therefore users can press the touch panel to input data and instruction without requiring to install traditional input devices (including a keyboard and a mouse) in order to save more working space or install a larger display panel to facilitate users to browse or input data.

In view of the description above, the ITO glass is a major component of the touch panel, and the ITO glass comprises a transparent glass substrate and a transparent conducting layer. In the fabrication of an ITO glass, an electrically insulating transparent glass substrate is coated with a layer of transparent conducting metal material, and the transparent conducting layer is formed on the transparent glass substrate. In general, the transparent conducting layer is made of indium tin oxide (ITO) and the transparent conducting layer is comprised of a plurality of ITO transparent electrodes disposed in the transparent glass substrate. Referring to FIG. 1 for a detailed description of the structure of the ITO glass, the manufacturing process of the ITO glass is described as follows:

(101) Rinsing: Before the transparent glass substrate is manufactured, it is necessary to rinse the surface of the transparent glass substrate to remove any dust and particle attached on the transparent glass substrate.

(Step 102) Coating: An indium tin oxide film is coated onto a lateral surface of the transparent glass substrate;

(Step 103) Coating a photoresist (P/R) layer: A layer of photoresist material is coated onto the transparent glass substrate having the indium tin oxide film by roller printing.

(Step 104) Prebake: The transparent glass substrate is heated slowly to coat and fix the photoresist layer onto the transparent glass substrate and prepare for the following processes.

(Step 105) Exposure: A fixed amount of ultraviolet (UV) light is projected onto the photoresist layer of the transparent glass substrate for a chemical reaction with the photoresist layer to form a masked pattern area and an exposed area on the photoresist layer.

(Step 106) Development: The exposed area is cleaned by a developer to wash away the photoresist layer in the exposed area in order to expose the indium tin oxide film.

(Step 107) Etching: The indium tin oxide film exposed from the exposed area is rinsed by royal water.

(Step 108) Stripping: An alkaline solution, preferably sodium hydroxide (KOH), is used for rinsing the masked pattern area to dissolve the photoresist layer on the masked pattern area, so that the required ITO transparent electrodes can be formed on the transparent glass substrate.

(Step 109) After-etch Inspection: The electrodes of the transparent glass substrate are inspected. If there is any short circuit found between the ITO electrodes, then the point of short circuit will be removed by a laser correction machine, so as to complete the fabrication of the ITO glass and prepare for the later process to install the transparent glass substrate into the touch panel.

When the ITO glass is used as an LCD display, users often observe a discontinuous layer, a blurred image, a particle formation or a reduced resolution of the display screen through the ITO glass, since the refractive index of the light at each position of the ITO glass is different. Referring to FIG. 2 for the ITO glass 1 produced by the foregoing process, the ITO glass 1 comprises a transparent glass substrate 10 and a plurality of ITO transparent electrodes 12 disposed on the transparent glass substrate. The refractive index of light at the positions of the transparent glass substrate 10 without the ITO transparent electrodes 12 ranges between 1.4 and 1.5, and the refractive index of light of the ITO transparent electrodes 12 ranges from 1.8 to 2.2. Since the refractive indexes of the two are different, the image quality of the screen observed by users will be lowered greatly, and the images of smaller graphics and texts will become blurred, and thus users may not be able to successfully press the correct pressing positions to execute a control instruction corresponding to the pressing position, and thus users cannot input their desired data or instruction successfully.

SUMMARY OF THE INVENTION

In view of the shortcomings of the prior art and a different refractive index of light at each position of the traditional ITO glass that often causes a discontinuous layer, a blurred image, a display particle or a reduced resolution observed by users through the ITO glass, the inventor of the present invention based on years of experience to conduct extensive researches and experiments, and finally designed and developed a method of hiding transparent electrodes on a transparent substrate in accordance with the present invention.

Therefore, it is a primary objective of the present invention to provide a method of hiding transparent electrodes on a transparent substrate, and the method coats a solution of non-conductive nanoparticles onto the transparent substrate and the transparent electrodes after forming a plurality of transparent electrodes on the transparent substrate, and the refractive indexes of light for both non-conductive nanoparticles and the transparent electrodes are the same. After a high-temperature thermal processing is performed to the transparent substrate for a thermal processing time, an even mask is formed on the transparent substrate and the transparent electrodes, such that the non-conductive nanoparticles in the mask provide the same refractive index of light for the positions of the transparent substrate with and without the transparent electrodes, so as to effectively prevent a different refractive index of light at any position of the transparent substrate that will cause a poor image quality of the screen.

DETAILED DESCRIPTION OF THE PREFERRED EMBODIMENTS

Figure 1:
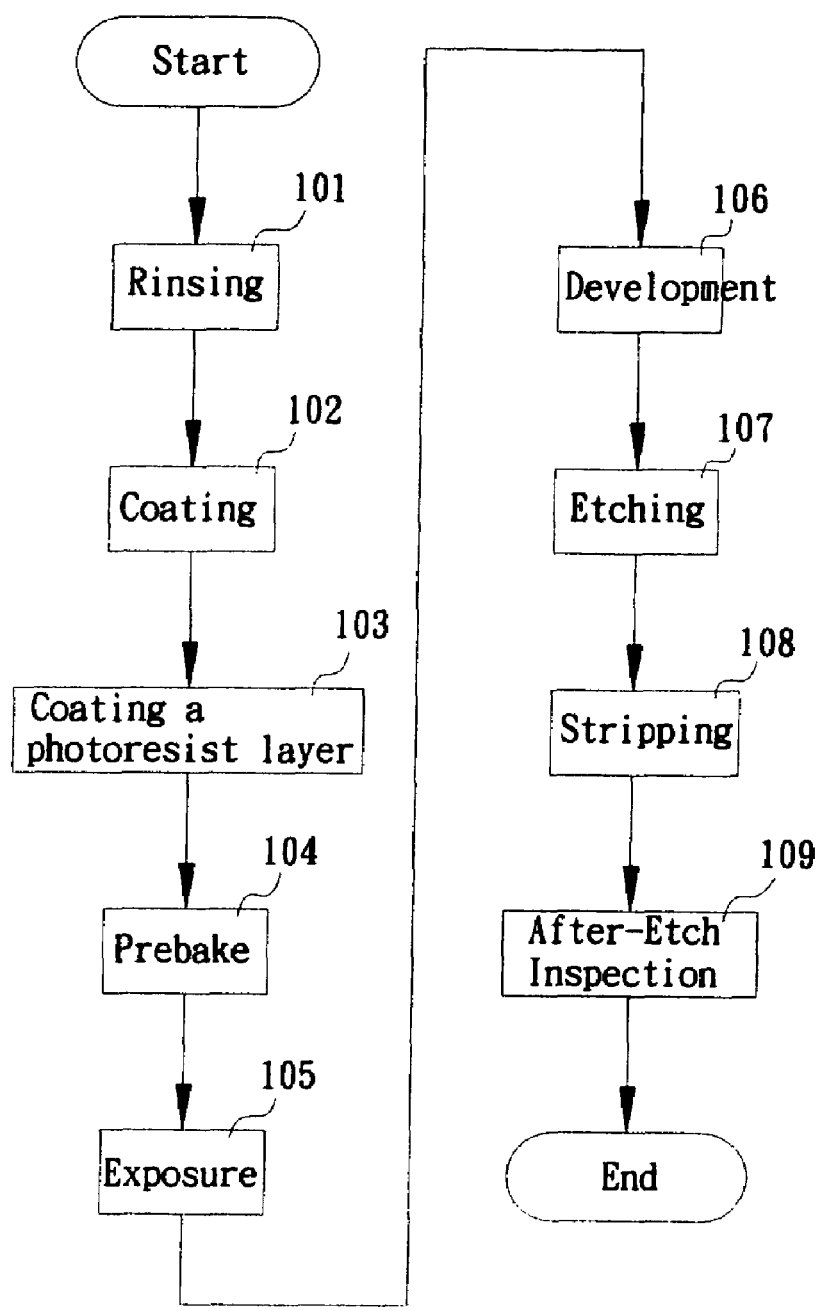
FIG. 1 is a flow chart of fabricating a prior art ITO glass.
Figure 2:
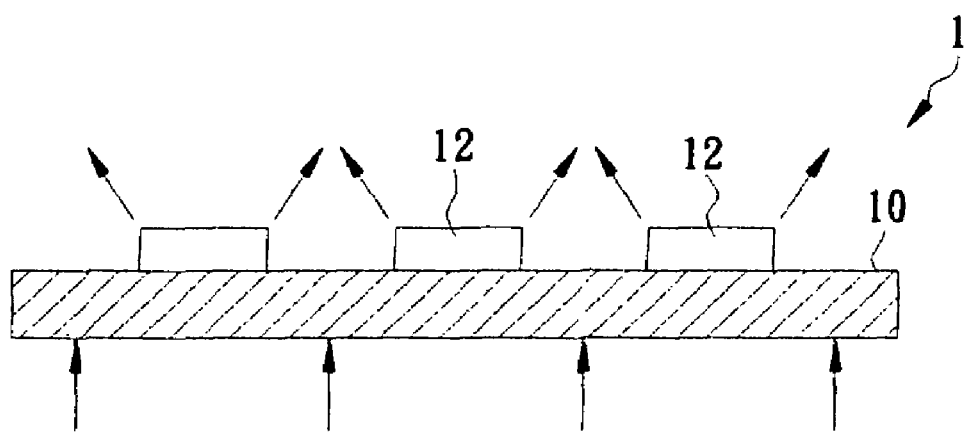
FIG. 2 is a schematic view of a prior art ITO glass.
Figure 3:
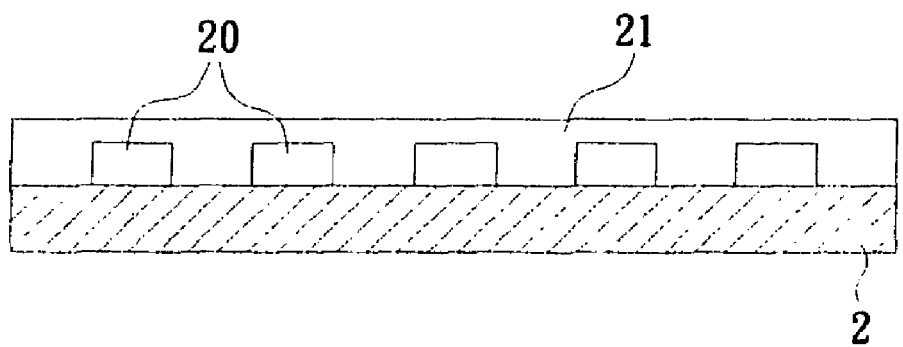
FIG. 3 is a schematic view of a transparent substrate of the invention.

Referring to FIG. 3 for a method of hiding transparent electrodes on a transparent substrate in accordance with the present invention, the method forms a plurality of transparent electrodes 20 on a transparent substrate 2, and then coats a solution of non-conductive nanoparticles onto the transparent substrate 2 and the transparent electrodes 20. The refractive indexes of light for both non-conductive nanoparticles and transparent electrodes 20 are the same, and then the transparent substrate 2 is processed by a high-temperature thermal processing for a thermal processing time, and a flat and even mask 21 is formed on the transparent substrate 2 and the transparent electrodes 20. With the non-conductive nanoparticles in the mask 21, the refractive indexes of light at the positions of the transparent substrate 2 with and without the transparent electrodes 20 are the same, so as to effectively prevent a different refractive index of light at any position of the transparent substrate 2 that will cause a poor image quality on the screen.

Figure 4:
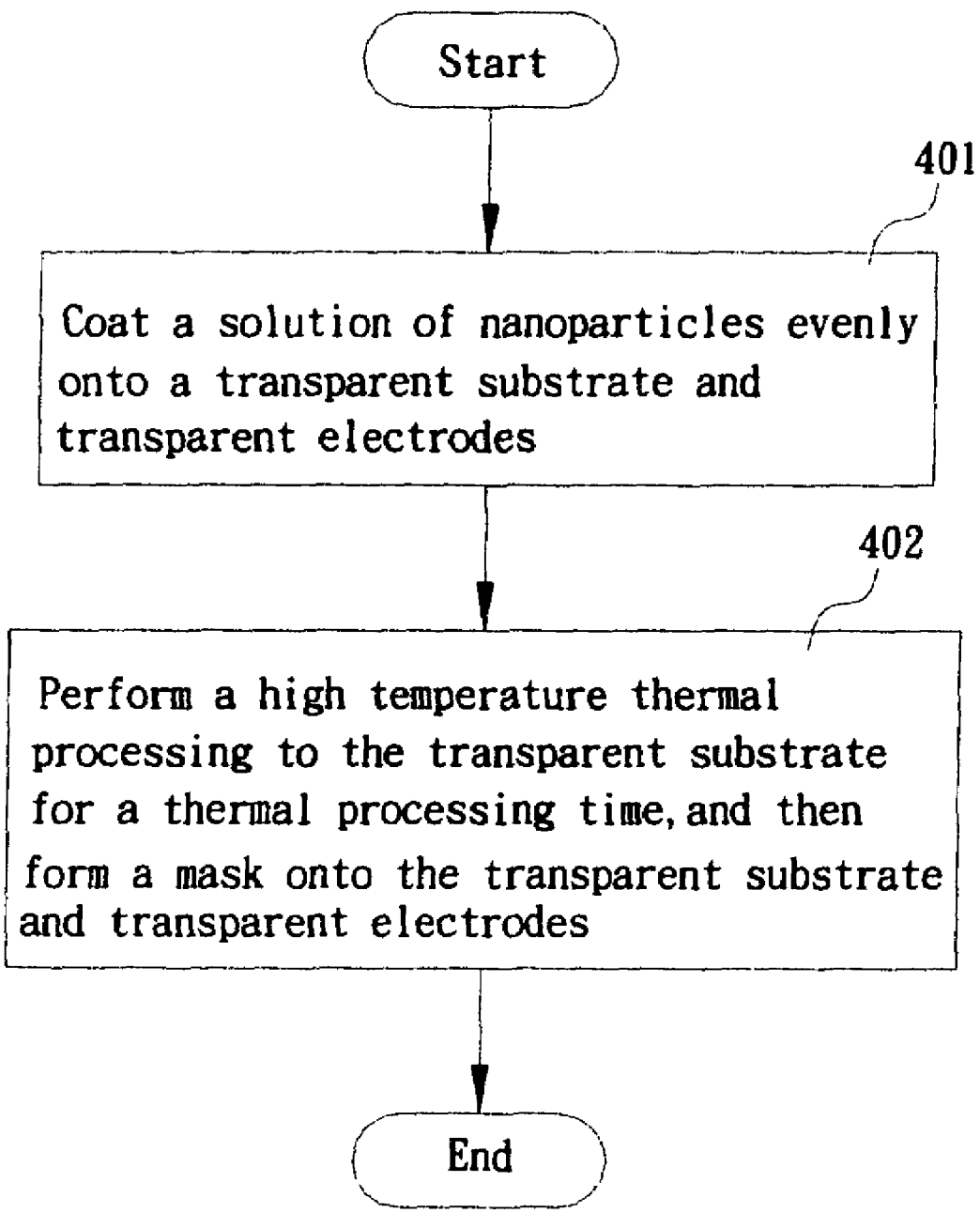
FIG. 4 is a flow chart of fabricating a transparent substrate and a mask of the invention.

Referring to FIG. 4 for the method used for processing a transparent substrate having a plurality of transparent electrodes 20 according to the present invention, the method comprises the steps of:

(Step 401) forming a solution of non-conductive nanoparticles having a refractive index of light equal to that of the transparent electrode 20, and evenly coating the solution onto the transparent substrate 2 and the transparent electrodes 20; and (Step 402) forming a flat and even mask 21 on the transparent substrate 2 and the transparent electrodes 20, after performing a high-temperature thermal processing to the transparent substrate 2 for a thermal processing time.

Figure 5:
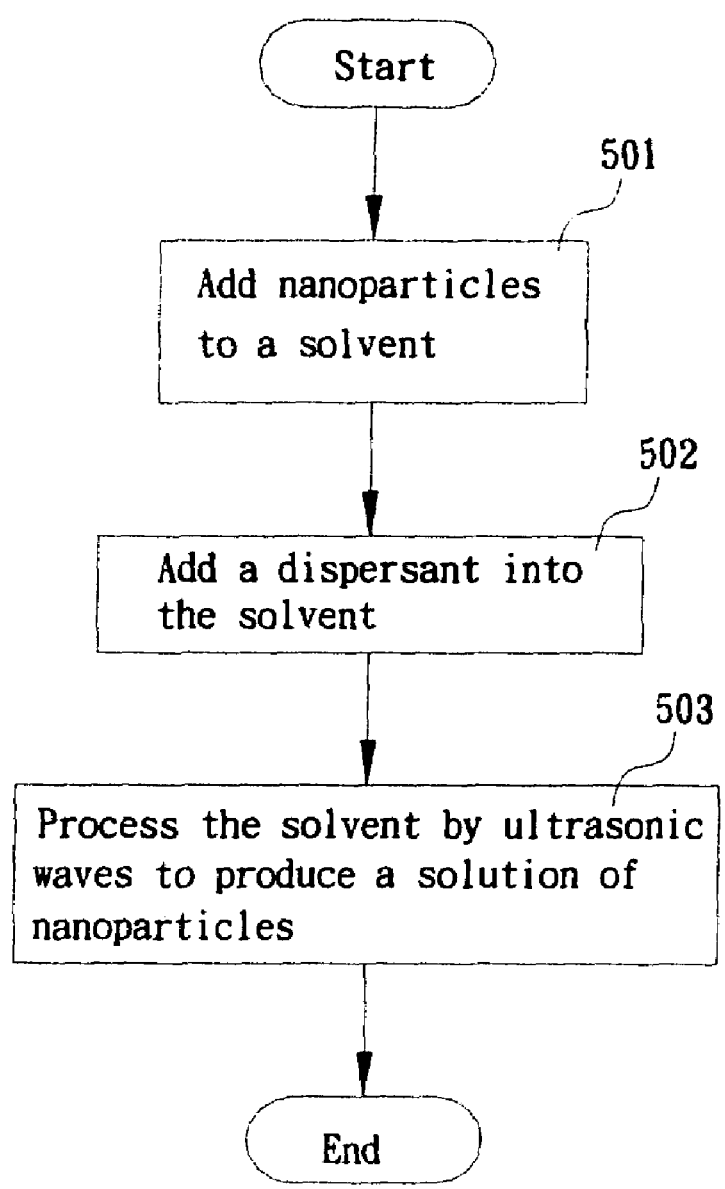
FIG. 5 is a flow chart of a preferred embodiment of the invention.

Referring to FIG. 5 for a preferred embodiment of the present invention, the method carries out the following process before forming a solution of non-conductive nanoparticles and coating the solution onto the transparent substrate 2 and the transparent electrodes 20, and such process comprises the steps of:

(Step 501) adding a solvent to the non-conductive nanoparticles;

(Step 502) adding a dispersant into the solvent; and (Step 503) processing the solvent by ultrasonic waves, so that the non-conductive nanoparticles are evenly dispersed in the solvent to produce the solution, and the non-conductive nanoparticle can be coated evenly onto the transparent substrate 2 and the transparent electrodes 20.

In FIG. 3, the refractive index of light for the non-conductive nanoparticles ranges from 1.8 to 2.2, and the non-conductive nanoparticles could be made of antimony (II) trioxide ($Sb_2O_3$), chromium (II) trioxide ($Cr_2O_3$), indium (II) trioxide ($In_2O_3$), tantanium (II) trioxide ($Ta_2O_3$), titanium dioxide ($TiO_2$) or zirconium oxide ($ZrO_2$) or their mixture, and the size of the nanoparticles ranges from 10 nm to 100 nm, such that when the nanoparticles are evenly coated onto the transparent substrate 2 and the transparent electrodes 20 to form a flat and even mask 21, the nanoparticles maintain the refractive index of light at the positions of the transparent substrate 2 with and without the transparent electrodes 20 in the range from 1.8 to 2.2 to effectively overcome the shortcomings of the ITO glass that causes a blurred image, a particle formation and a reduced resolution due to the different refractive indexes of light at different positions of the ITO glass.

In this preferred embodiment, the solvent is processed by ultrasonic waves and an adhesive is added into the solvent, before the dispersant is added to the solvent. The adhesive could be a siloxane compound, and the solvent could be ethanol, so that the solution of nanoparticles can be produced after processing by ultrasonic waves. After the solution of nanoparticles is coated onto the transparent substrate 2 and the transparent electrodes, the transparent substrate 2 is processed for at least 30 minutes, and the temperature of the high-temperature thermal processing is maintained in a range from 100° C. to 200° C. to evenly form a flat and even mask 21 onto the transparent substrate 2 and the transparent electrodes 20, so that the nanoparticles can be attached evenly onto the transparent substrate 2 and the transparent electrodes 20.

Figure 6:
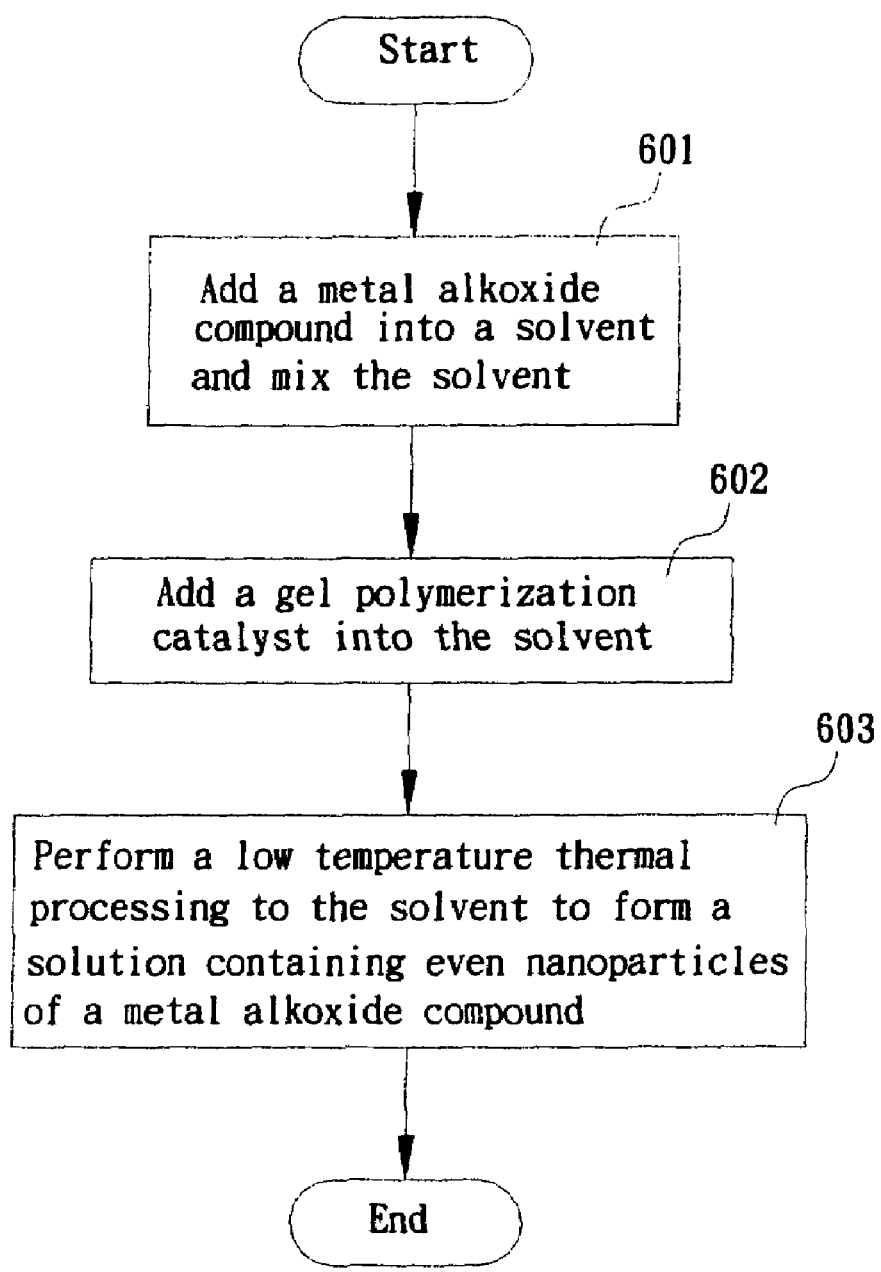
FIG. 6 is a flow chart of another preferred embodiment of the invention.

Referring to FIG. 6 for another preferred embodiment of the present invention, the method of producing the solution of non-conductive nanoparticles comprises the steps of:

(Step 601) adding a metal alkoxide compound into a solvent and mixing the solvent;

(Step 602) adding a gel polymerization catalyst into the solvent; and (Step 603) performing a low-temperature thermal processing to the solvent at a temperature ranging from 50° C. to 80° C. for a reaction time required for a sol-gel process, so as to form a solution containing even nanoparticles of a metal alkoxide compound.

In FIG. 3, the nanoparticles of the metal alkoxide compound have a refractive index of light ranging from 1.8 to 2.2 and the metal alkoxide compound could be titanium (IV) butoxide ($Ti(OCH_2CH_2CH_2CH_3)_4$), so that when the nanoparticles of the metal alkoxide compound are evenly coated onto the transparent substrate 2 and the transparent electrodes 20 to form a flat and even mask 21, the nanoparticles of the metal alkoxide compound can maintain the refractive index of light at the positions of the transparent substrate 2 with and without the transparent electrodes 20 within the range from 1.8 to 2.2, so as to effectively overcome the shortcomings of the traditional ITO glass having a blurred image, a color difference, a particle formation, or a reduced resolution due to the different refractive indexes of light at different positions of the ITO glass.

In another preferred embodiment, the solvent could be acetylacetone, and the gel polymerization catalyst could be nitric acid and water. After the solvent has gone through a sol-gel process for at least 60 minutes, the solution of nanoparticles of the metal alkoxide compound is produced, and the solution is coated onto the transparent substrate 2 and the transparent electrodes 20. After the transparent substrate 2 has gone through the high-temperature thermal processing process for at a temperature ranging from 200° C. to 300° C. for at least 60 minutes to form a flat and even mask 21 onto the transparent substrate 2 and the transparent electrodes 20, such that the nanoparticles of the metal alkoxide compound can be attached evenly onto the transparent substrate 2 and the transparent electrodes 20.

The method of the present invention not only can eliminate the etching lines formed between the transparent substrate 2 and the transparent electrodes 20 that may result adverse effects, but also can effectively overcome the poor image quality of the screen caused by different refractive indexes of light at the positions of the transparent substrate 2 with and without the transparent electrodes 20.

What is claimed is:

1. A component for an information display device, said component comprising:
    a transparent substrate having a surface;
    said surface having a first refractive index;
    said surface selectively coated in a pattern comprising a transparent electrically conductive layer disposed at least at a first region of said surface and at a second region of said surface;
    wherein said first region of said surface is separated from said second region of said surface by a third region of said surface devoid of said transparent conductive layer, said transparent conductive layer having a second refractive index higher than said first refractive index;
    said first, second and third regions commonly evenly overcoated with a transparent layer comprising nanoparticies, said transparent layer disposed over said transparent conductive layer at said first and second regions and also disposed over said third region devoid of said transparent conductive layer;
    wherein said transparent layer is substantially the same in the refractive index to said transparent conductive layer having said second refractive index; and
    wherein the refractive index of said transparent layer is from 1.8 to 2.0.

2. The component in accordance with claim 1, wherein said transparent substrate comprises a transparent glass substrate and wherein said first refractive index is at least 1.4.

3. The component in accordance with claim 2, wherein said first refractive index is less than 1.8.

4. The component in accordance with claim 3, wherein said transparent conductive layer comprises indium tin oxide.

5. The component in accordance with claim 4, wherein said transparent layer comprises nanopartides with a size ranging from 10 nm to 100 nm.

6. The component in accordance with claim 5, wherein said nanoparticles comprise a transparent metal oxide.

7. The component in accordance with claim 6, wherein said transparent metal oxide comprises an oxide of at least one of antimony (II) trioxide ($Sb_2O_3$), chromium (II) trioxide ($Cr_2O_3$), indium (II) trioxide ($In_2O_3$), tantanium (II) trioxide ($Ta_2O_3$), titanium dioxide ($TiO_2$) and zirconium oxide ($ZrO_2$).

8. The component in accordance with claim 6, wherein said transparent metal oxide comprises an oxide of titanium.

9. The component in accordance with claim 1, wherein said information display device comprises a liquid crystal display.

10. The component in accordance with claim 1, wherein said nanoparticles include a metal alkoxide compound.

11. The component in accordance with claim 10, wherein said metal alkoxide compound comprises titanium (IV) butoxide ($Ti(OCH_2CH_2CH_2CH_3)_4$).

12. A component for an information display device, said component comprising:
    a transparent substrate having a surface;
    said surface having a first refractive index;
    said surface selectively coated in a pattern comprising a transparent conductive layer disposed at least at a first region of said surface and at a second region of said surface;
    wherein said first region of said surface is separated from said second region of said surface by a third region of said surface devoid of said transparent conductive layer;
    said transparent conductive layer having a second refractive index higher than said first refractive index;
    said first, second and third regions commonly evenly overcoated with a transparent layer comprising nanopartides, said transparent layer disposed over said transparent conductive layer at said first and second regions and also disposed over said third region devoid of said transparent conductive layer;
    wherein said transparent layer is substantially the same in refractive index to said transparent conductive layer having said second refractive index; and
    wherein said transparent layer comprises nanopartides with a size ranging from 10 nm to 100 nm.

13. The component in accordance with claim 12, wherein said first refractive index is at least 1.4 and is less than 1.8.

14. The component in accordance with claim 13, wherein said transparent conductive layer comprises indium tin oxide.

15. The component in accordance with claim 14, wherein the refractive index of said transparent layer comprising is at least 1.8.

16. The component in accordance with claim 12, wherein said nanoparticles comprise a transparent metal oxide.

17. The component in accordance with claim 16, wherein said transparent metal oxide comprises an oxide of at feast one of antimony (II) trioxide ($Sb_2O_3$), chromium (II) trioxide ($Cr_2O_3$ indum (II) trioxide ($In_2O_3$), tantanium (II) trioxide ($Ta_2O_3$), titanium dioxide ($TiO_2$) and zirconium oxide ($ZrO_2$).

18. The component in accordance with claim 16 wherein said transparent metal oxide comprises an oxide of titanium.

19. The component in accordance with claim 18, wherein the refractive index of said transparent layer comprising nanoparticles is from 1.8 to 2.0.

20. The component in accordance with claim 12, wherein said information display device comprises a liquid crystal display.

21. The component in accordance with claim 12, wherein said nanoparticles include a metal alkoxide compound.

22. The component in accordance with claim 21, wherein said metal alkoxide compound comprises titanium (IV) butoxide ($Ti(OCH_2CH_2CH_2CH_3)_4$).

23. A component for an information display device, said component comprising:

a transparent substrate having a surface;
said surface having a first refractive index and wherein said first refractive index is at least 1.4 and is less than 8;
said surface selectively coated in a pattern comprising a transparent conductive layer disposed at least at a first region of said surface and at a second region of said surface;
wherein said first region of said surface is separated from said second region of said surface by a third region of said surface devoid of said transparent conductive layer,
said transparent conductive layer having a second refractive index higher than said first refractive index;
said first, second and third regions commonly overcoated with a transparent layer comprising nanoparticles, said transparent layer disposed over said transparent conductive layer at said first and second regions and also disposed over said third region devoid of said transparent conductive layer;
wherein said transparent layer is substantially the same in refractive index to said transparent conductive layer having said second refractive index;
wherein the refractive index of said transparent layer is at least 1.8;
wherein said transparent layer comprises nanoparticlies with a size ranging from 10 nm to 100 nm; and
wherein said nanoparticles comprise a transparent metal oxide.

24. The component in accordance with claim 23, wherein said transparent conductive layer comprises indum tin oxide.

25. The component in accordance with claim 23, wherein said transparent metal oxide comprises an oxide of at least one of antimony (II) trioxide ($Sb_2O_3$), chromium (II) trioxide ($Cr_2O_3$), indium (II) trioxide ($In_2O_3$), tantanium (II) trioxide ($Ta_2O_3$), titanium dioxide ($TiO_2$) and zirconium oxide ($ZrO_2$).

26. The component in accordance with claim 23, wherein said transparent metal oxide comprises an oxide of titanium.

27. The component in accordance with claim 26, wherein the refractive index of said transparent layer comprising nanoparticles is from 1.8 to 2.0.

28. The component in accordance with claim 24, wherein said information display device comprises a liquid crystal display.

29. The component in accordance with claim 23, wherein said nanoparticles include a metal alkoxide compound.

30. The component in accordance with claim 29, wherein said metal alkoxide compound comprises titanium (IV) butoxide ($Ti(OCH_2CH_2CH_2CH_3)_4$).

31. A component for an information display device, said component comprising:
a transparent substrate having a surface;
said surface having a first refractive index and wherein said first refractive index is at least 1.4 and is less than 1.8;
said surface selectively coated in a pattern comprising a transparent conductive layer disposed at least at a first region of said surface and at a second region of said surface;
wherein said first region of said surface is separated from said second region of said surface by a third region of said surface devoid of said transparent conductive layer,
said transparent conductive layer having a second refractive index higher than said first refractive index;
said first, second and third regions commonly overcoated with a transparent layer comprising nanoparticles, said transparent layer disposed over said transparent conductive layer at said first and second regions and also disposed over said third region devoid of said transparent conductive layer;
wherein said transparent layer is substantially the same in refractive index to said transparent conductive layer having said second refractive index;
wherein said nanoparticles with a size ranging from 10 nm to 100 nm comprise a transparent metal oxide; and
wherein said information display device comprises a liquid crystal display.

32. The component in accordance with claim 31, Wherein said first refractive index is at least 1.4 and is less than 1.8, and wherein the refractive index of said layer comprising nanoparticles is at least 1.8.

33. The component in accordance with claim 32, wherein said transparent conductive layer comprises indium tin oxide.

34. The component in accordance with daim 31, wherein said transparent metal oxide comprises an oxide of at least one of antimony (II) trioxide ($Sb_2O_3$), chromium (II) trioxide ($Cr_2O_3$), indium (II) trioxide ($In_2O_3$), tantanium (II) trioxide ($Ta_2O_3$), titanium dioxide ($TiO_2$) and zirconium oxide ($ZrO_2$).

35. The component in accordance with claim 31, wherein said transparent metal oxide comprises an oxide of titanium.

36. The component in accordance with claim 31, wherein the refractive index of said transparent layer comprising nanoparticles is from 1.8 to 2.0.

37. The component in accordance with claim 31, wherein said nanoparticles include a metal alkoxide compound.

38. The component in accordance with claim 37, wherein said metal alkoxide compound comprises titanium (IV) butoxide ($Ti(OCH_2CH_2CH_2CH_3)_4$).

* * * * *